(12) United States Patent
Byun

(10) Patent No.: US 9,991,502 B2
(45) Date of Patent: Jun. 5, 2018

(54) RECHARGEABLE BATTERY

(71) Applicant: SAMSUNG SDI CO., LTD., Yongin-si, Gyeonggi-do (KR)

(72) Inventor: Sang-Won Byun, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 874 days.

(21) Appl. No.: 14/244,237

(22) Filed: Apr. 3, 2014

(65) Prior Publication Data

US 2015/0093609 A1  Apr. 2, 2015

(30) Foreign Application Priority Data

Sep. 27, 2013  (KR) .......................... 10-2013-0115489

(51) Int. Cl.
*H01M 2/34* (2006.01)

(52) U.S. Cl.
CPC ............. *H01M 2/345* (2013.01); *H01M 2/34* (2013.01); *H01M 2/348* (2013.01); *H01M 2200/103* (2013.01); *H01M 2200/20* (2013.01)

(58) Field of Classification Search
CPC ................................. H01M 2/34; H01M 2/345
USPC ....................................................... 429/7, 61
See application file for complete search history.

(56) References Cited

U.S. PATENT DOCUMENTS

| 2002/0113685 A1* | 8/2002 | Izaki .................... H01H 37/761 337/405 |
| 2005/0083166 A1* | 4/2005 | Senda .................... C22C 28/00 337/159 |
| 2011/0244280 A1 | 10/2011 | Byun et al. |
| 2011/0305928 A1* | 12/2011 | Kim .................. H01M 10/0431 429/61 |
| 2013/0011699 A1 | 1/2013 | Kim et al. |

FOREIGN PATENT DOCUMENTS

| EP | 2 544 265 A1 | 3/2012 |
| JP | 10-188946 | 7/1998 |
| KR | 10-2003-0025077 A | 3/2003 |
| KR | 10-2011-0109769 A | 10/2011 |
| KR | 10-2013-0006274 A | 1/2013 |

OTHER PUBLICATIONS

Korean Office Action dated Jul. 1, 2016 in Corresponding Korean Patent Application No. 10-2013-0115489.

* cited by examiner

*Primary Examiner* — Jonathan G Leong
(74) *Attorney, Agent, or Firm* — Lee & Morse, P.C.

(57) ABSTRACT

A rechargeable battery includes an electrode assembly for charging and discharging, a case in which the electrode assembly is stored; an electrode terminal electrically connected to the electrode assembly; a current collecting portion that electrically connects the electrode assembly with the electrode terminal, the current collecting portion including a fuse portion; and an insulation portion that insulates the fuse portion, the insulation portion being slidable in response to pressure applied in the fuse portion.

9 Claims, 7 Drawing Sheets

RECHARGEABLE BATTERY

CROSS-REFERENCE TO RELATED APPLICATION

Korean Patent Application No. 10-2013-0115489, filed on Sep. 27, 2013, in the Korean Intellectual Property Office, and entitled: "Rechargeable Battery," is incorporated by reference herein in its entirety.

BACKGROUND

1. Field

Embodiments relate to a rechargeable battery.

2. Description of the Related Art

A rechargeable battery differs from a primary battery in that it can be repeatedly charged and discharged, while the latter is incapable of being recharged.

A low-capacity rechargeable battery is used in small portable electronic devices such as mobile phones, notebook computers, and camcorders, while a high-capacity rechargeable battery is widely used as a power source for driving a motor of a hybrid vehicle and the like.

Recently, a high power rechargeable battery using a non-aqueous electrolyte and having high energy density has been developed. The high power rechargeable battery is formed by coupling a plurality of rechargeable batteries in series to be used as a power source for driving a motor of a device requiring a large amount of electric power, for example, an electric vehicle and the like. A rechargeable battery may be formed in a cylindrical shape, a prismatic shape, a pouch shape, or the like.

SUMMARY

Embodiments are directed to a rechargeable battery including an electrode assembly for charging and discharging, a case in which the electrode assembly is stored, an electrode terminal electrically connected to the electrode assembly, a current collecting portion that electrically connects the electrode assembly with the electrode terminal, the current collecting portion including a fuse portion, and an insulation portion that insulates the fuse portion, the insulation portion being slidable in response to pressure applied in the fuse portion.

The current collecting portion may include a current collecting plate connected to the electrode assembly and a current collecting lead member connecting the electrode terminal with the current collecting plate.

The current collecting lead member may include a terminal lead portion connected to the electrode terminal and a current collecting lead portion that extends from the terminal lead portion and is connected to the current collecting plate.

The fuse portion may be in the terminal lead portion.

The fuse portion may be in the current collecting lead portion.

The lead member may include a sliding hole. The fuse portion may bridge the sliding hole at one lateral side of the lead member.

The fuse portion may include coupling portions at opposite sides of the sliding hole on one lateral side of the current collecting lead portion, the coupling portions being electrically connected to the current collecting lead portion, and a fuse sheet connecting a space between the coupling portions.

The coupling portion may be arc-welded to the lead member.

The insulation portion of the fuse portion may include a first insulation portion that covers one lateral side of the fuse sheet, and a second insulation portion that covers another lateral side of the fuse sheet, the second insulation portion being integrally formed with the first insulation portion, and the insulation portion including a insertion space for the fuse sheet between the first and second insulation portions.

The first and second insulation portions may contact respective lateral sides of the fuse sheet.

The first and second insulation portions may be bent to protrude toward the electrode assembly.

The insulation portion may be slidable in response to a gas pressure created by melting of the fuse portion when a current exceeding a predetermined level flows in the fuse portion, such that the insulation portion increases a separation between the respective of separated parts of the fuse portion.

Slidability between the insulation portion and the separated parts of the fuse may be in a direction in which the separated parts separate from each other.

Slidability of the insulation portion may include slidable engagement between the insulation portion and a sliding hole in the current collecting portion.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
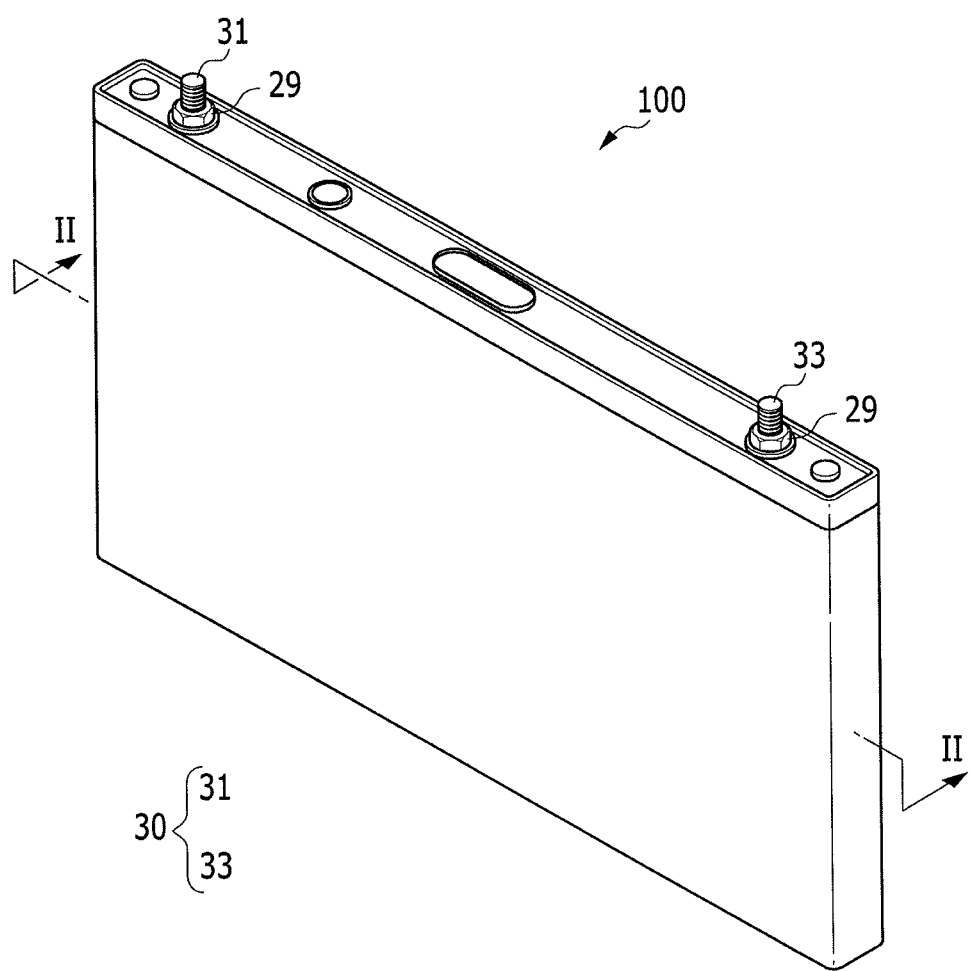
FIG. 1 illustrates a view schematically depicting a rechargeable battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
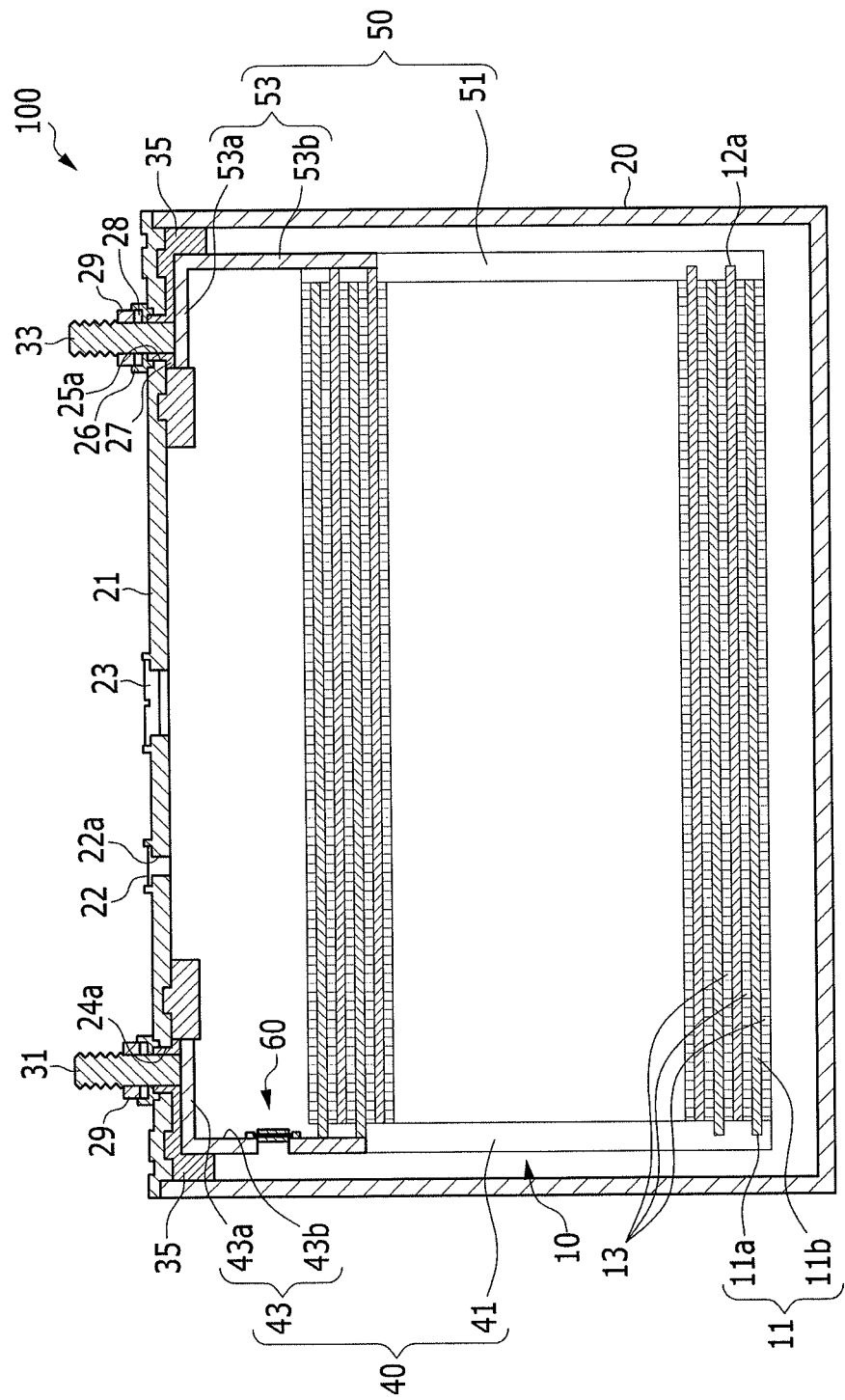
FIG. 2 illustrates a cross-sectional view of the rechargeable battery in FIG. 1, taken along the line II-II.

FIG. 1 illustrates a view schematically depicting a rechargeable battery according to an exemplary embodiment, and FIG. 2 illustrates a cross-sectional view of the rechargeable battery in FIG. 1, taken along the line II-II.

As shown in FIG. 1 and FIG. 2, the rechargeable battery 100 according to this exemplary embodiment may include an electrode assembly 10 for charging and discharging, a case 20 in which the electrode assembly 10 is stored, an electrode terminal 30 electrically connected to the electrode assembly 10, current collecting portions 40 and 50 which electrically connect the electrode assembly 10 and the electrode terminal 30 and include a fuse portion 60, and an insulation portion 65 to insulate the fuse portion 60.

Herein, the rechargeable battery 100 is exemplarily illustrated as a prism-shaped lithium ion rechargeable battery.

The electrode assembly 10 may include a first electrode plate, a separator 13, and a second electrode plate. The electrode assembly 10 may be formed in a jelly-roll shape by spirally winding the first electrode plate, the separator 13, and the second electrode plate.

In other implementations, the first electrode plate, the separator 13, and the second electrode plate may be formed to be multi-layered while being alternately arranged. In this instance, the separator 13 may be interposed between the first and second electrode plates.

In some implementations, the first electrode plate may be a positive electrode plate 11 and the second electrode may be a negative electrode plate 12.

The case 20, which stores the electrode assembly 10, may be formed as a prismatic can shape with one opened side. The electrode assembly 10, along with an electrolyte solution, may be placed in the case 20 through the opened side.

A cap plate 21 may be coupled to the opened side of the case 20, and may close and seal the case 20 into which the electrode assembly 10 is placed. The cap plate 21 may cover the case 20 while allowing the electrode terminal 30 to protrude outwards.

The interfacing part between the case 20 and the cap plate 21 may be laser welded to close and seal the case 20 which stores the electrode assembly 10 along with the electrolyte solution.

The cap plate 21 may be formed in a shape of a thin plate. The cap plate 21 may be formed with an electrolyte injection opening 22a. A sealing cap 22 may be fitted into the electrolyte injection opening 22a after the electrolyte solution is injected. A vent member 23 may be provided with a groove, in the cap plate 21, to be ruptured at a predetermined internal pressure.

Terminal holes 24a and 25a may respectively penetrate the cap plate 21. The terminal holes 24a and 25a may respectively be a positive electrode terminal hole 24a and a negative electrode terminal hole 25a. A positive electrode terminal 31 may protrude outwards by penetrating the positive electrode terminal hole 24a. A negative electrode terminal 33 may protrude outwards by penetrating the negative electrode terminal hole 25a.

Gaskets 26 and 27 may be provided to be respectively interposed between the cap plate 21 and the electrode terminals 31 and 33. The upper gasket 26 may be provided to be inserted above the cap plate 21.

The positive and negative electrode terminals 31 and 33 may be respectively formed with screw threads, and may be respectively fastened with nuts 29. The nuts 29 may respectively support the electrode terminals 31 and 33 from above. A washer 28 may be provided above the upper gaskets 26 to buffer a fastening force.

In other implementations, the electrode terminals 31 and 33 may be respectively formed in a rivet shape. In this instance, parts of the electrode terminals 31 and 33 may protrude outwards by respectively penetrating the terminal holes 24a and 25a. Protruded parts of the electrode terminals 31 and 33 may be respectively pressed to have a wide flat shape while the upper gaskets 26 are respectively inserted between the terminal holes 24a and 25a and the protruded parts of the electrode terminals 31 and 33, and thereby are respectively fixed to the cap plate 21.

The current collecting portions 40 and 50 may respectively include current collecting plates 41 and 51 that are connected to the first and second electrode terminals, and lead members 43 and 53 that connect the electrode terminal 30 and the current collecting plates 41 and 51.

The lead members 43 and 53 may respectively include terminal lead portions 43a and 53a that are respectively connected to the electrode terminal 30, and current collecting lead portions 43b and 53b that respectively extend from the terminal lead portions 43a and 53a and are respectively connected to the current collecting plates 41 and 51.

The positive electrode current collecting portion 40 may include the positive electrode current collecting plate 41 and the positive electrode lead member 43. The negative electrode current collecting portion 50 may include the negative electrode current collecting plate 51 and the negative electrode lead member 53. The current collecting plates 41 and 51 may respectively be the positive electrode current collecting plate 41 and the negative electrode current collecting plate 51. The lead members 43 and 53 may respectively be the positive electrode lead member 43 and the negative electrode lead member 53.

The current collecting portions 40 and 50 may be integrally formed. The positive electrode current collecting portion 40 may be integrally formed with the positive electrode current collecting plate 41 and the positive electrode lead member 43. The negative electrode current collecting portion 50 may be integrally formed with the negative electrode current collecting plate 51 and the negative electrode lead member 53.

The positive electrode current collecting plate 41 may be connected by welding to a positive electrode uncoated region 11a of the electrode assembly 10. The positive electrode current collecting plate 41 may be electrically connected to the positive electrode terminal 31 through the positive electrode lead member 43. Accordingly, the positive electrode terminal 31 may be connected by welding to the positive electrode plate 11 of the electrode assembly 10 through the positive electrode lead member 43 and the positive electrode current collecting plate 41.

The negative electrode current collecting plate 51 may be connected by welding to a negative electrode uncoated region 12a of the electrode assembly 10. The negative electrode current collecting plate 51 may be electrically connected to the negative electrode terminal 33 through the negative electrode lead member 53. Accordingly, the negative electrode terminal 31 may be connected to the negative electrode plate 12 of the electrode assembly 10 through the negative electrode lead member 53 and the negative electrode current collecting plate 51.

Insulation members 35 for insulation may be respectively provided between the lead members 43 and 53 and the cap plate 21.

The lead members 43 and 53 respectively include the terminal lead portions 43a and 53a and the current collecting lead portions 43b and 53b. The terminal lead portions 43a and 53a may be respectively coupled with the electrode terminals 31 and 33 to be electrically connected thereto.

The current collecting lead portions 43b and 53b may be respectively combined with the current collecting plates 41 and 51 to be electrically connected thereto.

The rechargeable battery 100 according to the present exemplary embodiment may be a lithium-ion rechargeable battery. In other implementations, the rechargeable battery 100 may be any one of various other types of batteries, such as a nickel-cadmium rechargeable battery, a nickel-hydrogen rechargeable battery, or a lithium battery.

The rechargeable battery 100 according to the present exemplary embodiment is exemplarily illustrated as a prism-shaped rechargeable battery. In other implementations, the rechargeable battery 100 may be any one of various other types of batteries, such as a cylindrical battery or a pouch-shaped battery.

The positive electrode plate 11, the positive electrode current collecting plate 41, and the positive electrode lead member 43 may be electrically connected to each other, and may be formed: of a same material, for example, a material including aluminum.

The negative electrode plate 12, the negative electrode current collecting plate 51, and the negative electrode lead member 53 may be electrically connected to each other, and may be formed of a same material, for example, a material including copper.

The fuse portion 60 may be formed in the current collecting portions 40 and 50. The fuse portion 60 may be formed in at least one of the positive electrode current collecting portion 40 and the negative electrode current collecting portion 50.

The fuse portion 60 according to the first exemplary embodiment may be formed in the positive electrode current collecting portion 40. In this instance, the fuse portion 60 may be formed of aluminum, which has a lower melting point than copper. Accordingly, the fuse portion 60 may have improved performance.

Herein, the fuse portion 60 may be provided in the lead member 43 in order to have a simpler structure. For example, the fuse portion 60 may be provided in the current collecting lead portion 43b to provide sufficient room to install the insulation portion 65.

Figure 3:
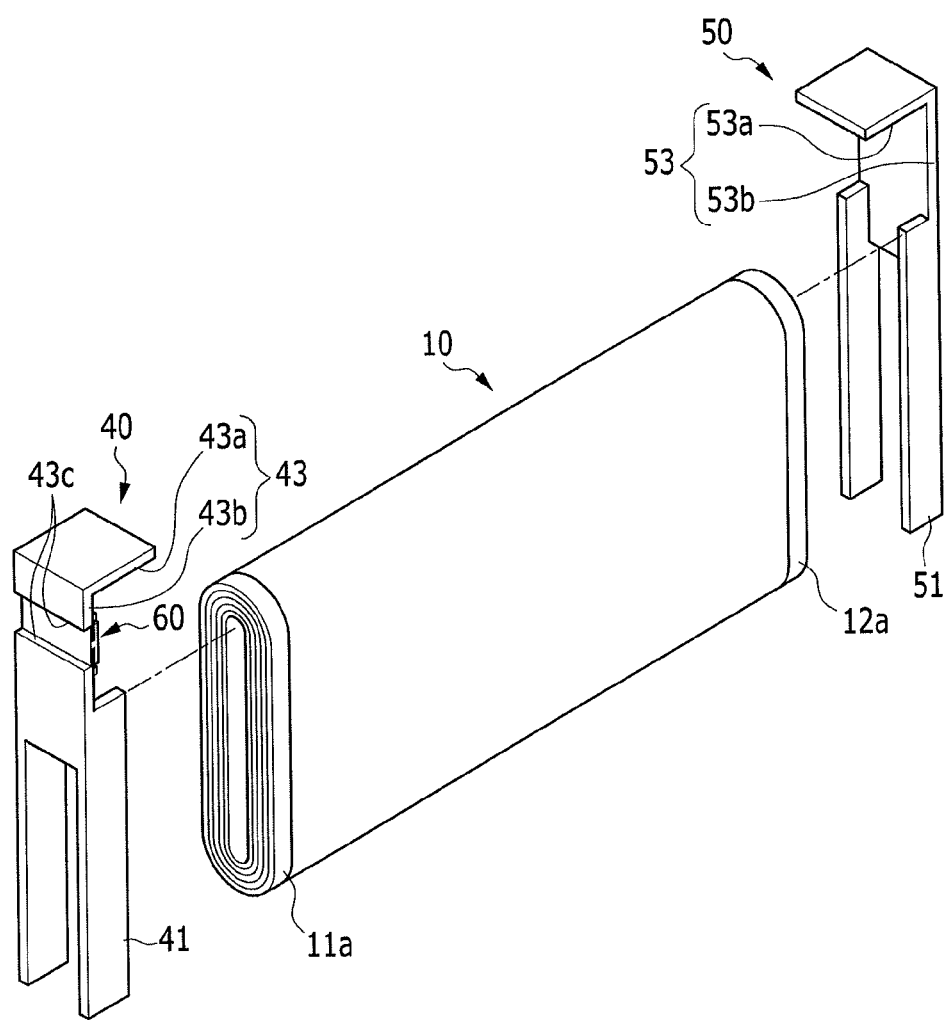
FIG. 3 illustrates an exploded view schematically depicting a state in which an electrode assembly is separated from current collecting lead portion.
Figure 4:
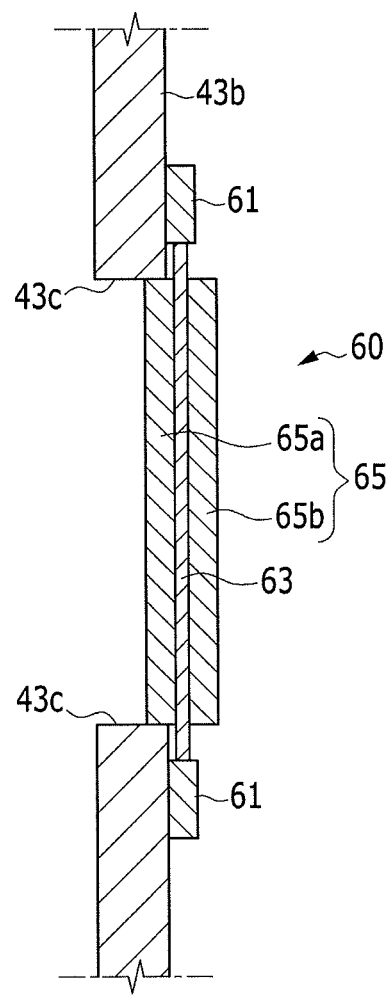
FIG. 4 illustrates a cross-sectional view schematically depicting a fuse portion provided in the current collecting lead portion.

FIG. 3 illustrates an exploded view schematically depicting a state in which the electrode assembly is separated from the current collecting lead portion in order to better show the location of the fuse portion, and FIG. 4 illustrates a cross-sectional view schematically depicting the fuse portion provided in the current collecting lead portion.

As shown in FIG. 3 and FIG. 4, the fuse portion 60 may be provided to bridge a sliding hole 43c formed in the current collecting lead portion 43b. The fuse portion 60 may include coupling portions 61 provided respectively at opposite sides of the sliding hole 43c on one lateral side of the current collecting lead portion 43b, and a fuse sheet 63 that connects a space between the coupling portions 61.

The coupling portions 61 may be coupled by arc welding to respective surfaces of the one lateral side of current collecting lead portion 43b. The one lateral side of the current collecting lead portion 43b may be a side that faces towards the electrode assembly 10.

Two coupling portions 61 may be provided at respective opposite sides of the sliding hole 43c formed in the current collecting lead portion 43b such that the two coupling portions 61 are electrically connected to each other through the fuse sheet 63.

One end of the fuse sheet 63 may be coupled to one coupling portion 61 that is attached to one side of the sliding hole 43c, and the other end of the fuse sheet 63 may be coupled to another coupling portion 61 that is attached to the other side of the sliding hole 43c. The fuse sheet 63 may be coupled to the coupling portions 61 by ultrasonic welding.

In the event of an overcurrent, a part of the fuse sheet 63 in its length direction may be melted and then separated to protect the rechargeable battery 100 from the overcurrent, thereby improving the stability of the rechargeable battery 100.

The insulation portion 65 may be provided at the outer side of the fuse sheet to extinguish an arc generated between the separated parts of the fuse sheet 63. The process of extinguishing the arc generated at the fuse sheet 63, using the insulation portion 65, will be described in more detail below when referring to the insulation portion 65.

As shown in FIG. 4, the insulation portion 65 may include a first insulation portion 65a to cover one lateral side of the fuse sheet 63 and a second insulation portion 65b to cover the other lateral side of the fuse sheet 63. A space in which the fuse sheet 63 is inserted may be provided between the first and second insulation portions 65a and 65b. The first and second insulation portions 65a and 65b may be provided to contact the fuse sheet 63 at respective lateral sides thereof.

A part of the fuse sheet 65 having the structure described above may be melted when a current exceeding the predetermined level flows in the fuse sheet 63. A space may be thereby created between the respective ends of the separated parts of the fuse sheet.

Figure 5:
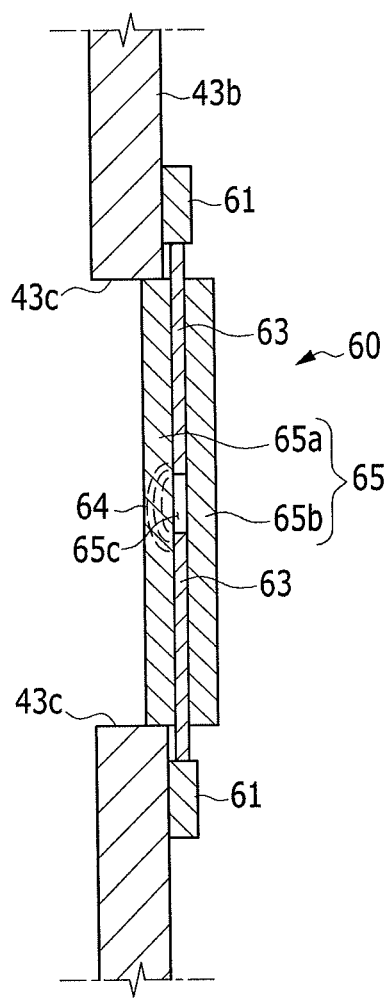
FIG. 5 illustrates a cross-sectional view schematically depicting a state in which a part of a fuse sheet is melted and then separated inside an insulation portion as an overcurrent flows through a fuse sheet.

FIG. 5 illustrates a cross-sectional view schematically depicting a state in which the part of the fuse sheet is melted and then separated inside the insulation portion as an overcurrent flows through the fuse sheet. As shown in FIG. 5, when the overcurrent flows, the part of the fuse sheet 63 may be melted and then separated to form a gas space 65c between the first and second insulation portions 65. The gas space 65c may be filled with gas formed during melting of the part of the fuse sheet 63.

Figure 6:
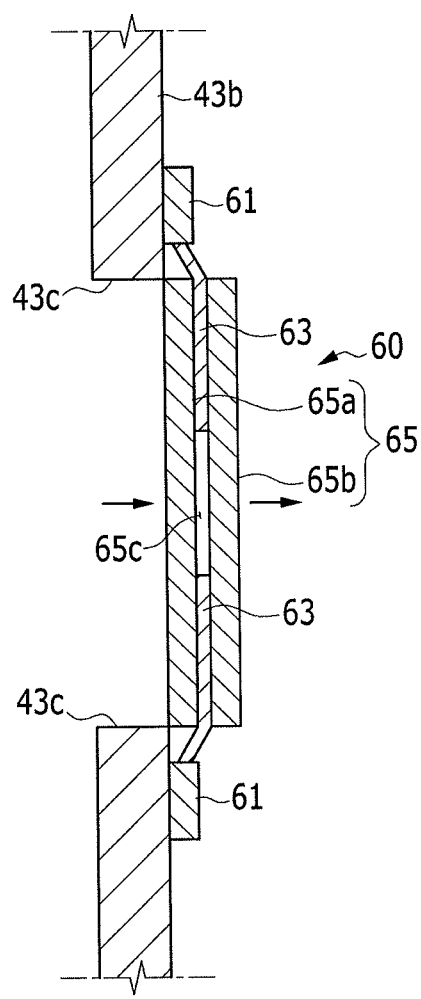
FIG. 6 illustrates a cross-sectional view schematically depicting a state in which respective separated ends of the fuse sheet are separated by sliding of the insulation portion such that an arc is thereby extinguished.

At the time of melting, the respective ends of the separated parts of the fuse sheet 63 inside the insulation portion 65 may be disposed close to each other, thereby generating an arc 64. As shown in FIG. 6, the arc 64 generated by the fuse sheet 63 may be extinguished, as the respective ends of the separated parts of the fuse sheet 63 are further separated from each other by sliding of the insulation portion 65.

FIG. 6 illustrates a cross-sectional view schematically depicting a state in which respective ends of the separated parts of the fuse sheet are separated by sliding of the insulation portion, thereby extinguishing the arc.

As shown in FIG. 6, when a predetermined time passes after the gas is created by melting the part of the fuse sheet 63 inside the insulation portion 65, the insulation portion 65 may be moved along the sliding hole 43c toward one side of the current collecting lead portion 43b. When the part of the fuse sheet 63 is melted in the insulation portion 65, the gas space 65c is created between the first and second insulation portions 65a and 65b to be filled with the gas. The gas space 65 may be filled by gas having a high pressure due to continuous melting of the fuse sheet 63.

The gas filling the gas space 65c may be released out of the insulation portion 65 at a predetermined pressure when a predetermined time passes.

As the insulation portion 65 is moved along the sliding hole 43c to one side by the repulsive force of the emission of the gas, the respective ends of the separated parts of the fuse sheet 63 may be further separated from each other, as shown in FIG. 6.

The arc generated at the respective ends of the separated parts of the fuse sheet 63 may be extinguished as the respective ends of the separated parts of the fuse sheet 63 are further separated. Accordingly, the external short-circuit characteristic of the rechargeable battery may be improved.

The insulation portion 65 according to the present embodiment may be made of a fluorine resin material having superior flame resistance, wear resistance, and chemical resistance.

A part of the insulation portion 65 may be bent to protrude toward its moving direction. The insulation portion 60 may be partially bent to provide a passage of the gas through which the gas filled in the gas space 65c may be released in a direction opposite to its moving direction.

Figure 7:
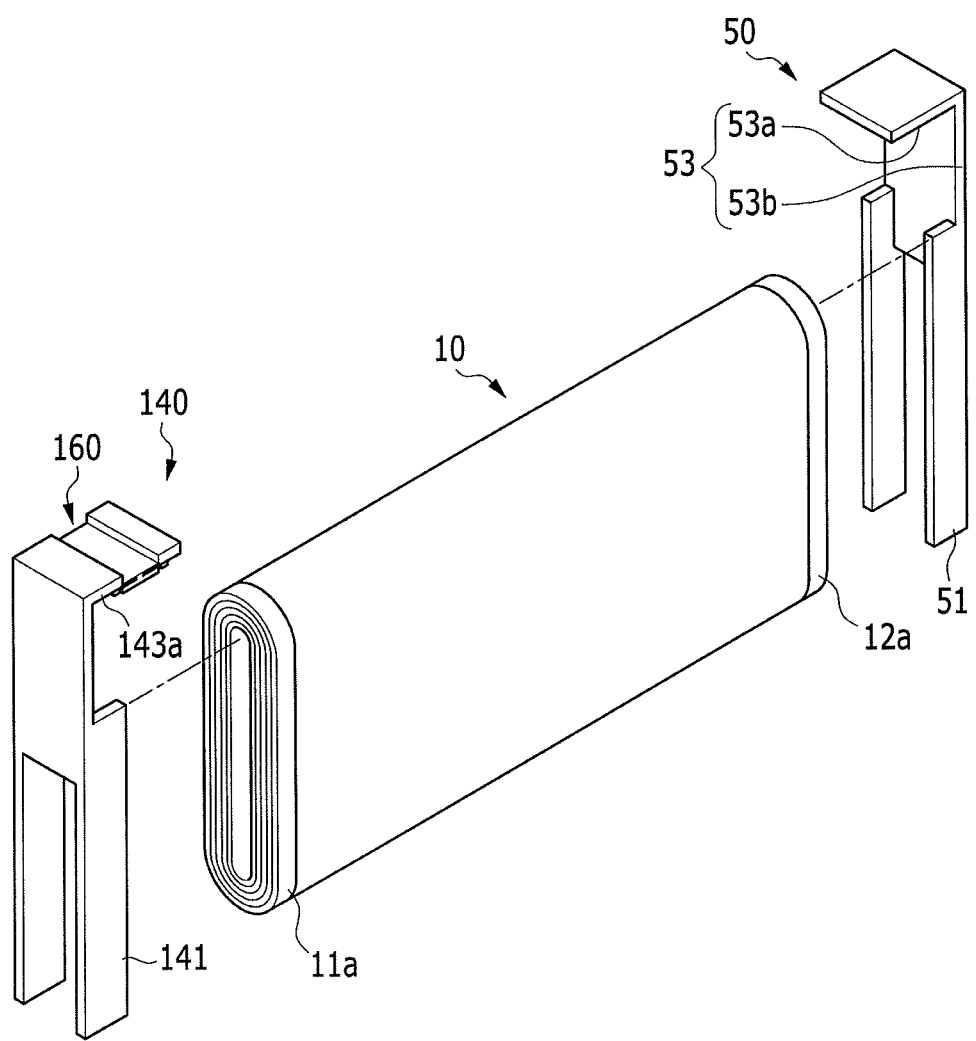
FIG. 7 illustrates a perspective view schematically depicting a fuse portion provided in a rechargeable battery according to another exemplary embodiment.

FIG. 7 illustrates a schematic perspective view of a fuse portion provided in a rechargeable battery according to another exemplary embodiment.

The same reference numbers of FIG. 1 to FIG. 6 refer to the same members in FIG. 7 having the same functions. Hereinafter, a detailed description of features having the same reference numbers will not be repeated.

As shown in FIG. 7, a fuse portion 160 of the rechargeable battery according to this exemplary embodiment may be provided in the terminal lead portions 143a or 53a.

For example, the fuse portion 160 may be located at a part of the terminal lead portion 143a of a current collecting portion 140 that is electrically connected to an electrode assembly 10.

The fuse portion 160 according to the present exemplary embodiment may have the same structure as the fuse portion according to the exemplary embodiment illustrated in FIGS. 1 to 6, except for being provided at a different position, for example, in a part of the terminal lead portions 143a or 53a.

By way of summation and review, a rechargeable battery may include an electrode assembly having a separator interposed between positive and negative electrodes; a case having a space in which the electrode assembly is stored; a cap plate which seals the case and is provided with a terminal hole to be inserted by a terminal; and the terminal to be electrically connected through the electrode assembly and a current collecting portion and to protrude out of the case while being inserted in the terminal hole.

In a rechargeable battery, a fuse may cut off an overcurrent in the current collecting portion when an overcurrent occurs. When a part of the fuse is melted due to the overcurrent, it may be difficult to effectively cut off the overcurrent due to arc generation when ends of the separated parts of the fuse are disposed close to each other.

Embodiments provide a rechargeable battery having an improved short circuit characteristic. Embodiments provide a rechargeable battery in which arc generation is prevented at the separated parts of the fuse even if a part of the fuse is melted and then separated. In case a part of the fuse sheet is melted and then separated due to an overcurrent, the short-circuit characteristic of the rechargeable battery may be improved by preventing arc generation at the gap of the separated parts of the fuse sheet.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A rechargeable battery, comprising:
    an electrode assembly for charging and discharging;
    a case in which the electrode assembly is stored;
    an electrode terminal electrically connected to the electrode assembly;
    a current collecting portion that electrically connects the electrode assembly with the electrode terminal, the current collecting portion including a sliding hole that separates parts of the current collecting portion from each other and a fuse portion, the fuse portion including a fuse sheet coupled to separated parts of the current collecting portion and bridging the sliding hole to connect to the separated parts of the current collecting portion, the fuse sheet being offset from the current collecting portion; and
    an insulation portion that insulates the fuse portion, the insulation portion having a length corresponding to a distance between the separated parts of the current collecting portion, the insulation portion sliding in a direction away from the sliding hole in response to pressure applied in the fuse portion, wherein the insulation portion includes a first insulation portion that contacts and covers one lateral side of the fuse sheet and a second insulation portion that contacts and covers another lateral side of the fuse sheet.

2. The rechargeable battery as claimed in claim 1, wherein the current collecting portion includes a current collecting plate connected to the electrode assembly and a current collecting lead member connecting the electrode terminal with the current collecting plate.

3. The rechargeable battery as claimed in claim 2, wherein the current collecting lead member includes a terminal lead portion connected to the electrode terminal and a current collecting lead portion that extends from the terminal lead portion and is connected to the current collecting plate.

4. The rechargeable battery as claimed in claim 3, wherein the fuse portion is in the current collecting lead portion.

5. The rechargeable battery as claimed in claim 3, wherein:
    the fuse portion includes coupling portions at opposite sides of the sliding hole on a lateral side of the current collecting lead portion facing the interior of the case, the coupling portions being electrically connected to the current collecting lead portion, and
    the fuse sheet connects a space between the coupling portions.

6. The rechargeable battery as claimed in claim 5, wherein the coupling portions are arc-welded to the current collecting lead member.

7. The rechargeable battery as claimed in claim 5, wherein:
    the second insulation portion is integrally formed with the first insulation portion, and
    the insulation portion includes an insertion space for the fuse sheet between the first and second insulation portions.

8. The rechargeable battery as claimed in claim 7, wherein the first and second insulation portions contact respective lateral sides of the fuse sheet.

9. The rechargeable battery as claimed in claim 1, wherein the insulation portion slides in response to a gas pressure created by melting of the fuse portion when a current exceeding a predetermined level flows in the fuse portion, such that the insulation portion increases a separation between separated parts of the fuse portion.

\* \* \* \* \*